US012776850B2

(12) United States Patent
Effenberger et al.

(10) Patent No.: US 12,776,850 B2
(45) Date of Patent: Oct. 27, 2026

(54) COORDINATED TRANSMISSION IN MULTI-PASSIVE OPTICAL NETWORK (PON) SYSTEMS

(71) Applicant: HUAWEI TECHNOLOGIES CO., LTD., Shenzhen (CN)

(72) Inventors: Frank Effenberger, Glen Mills, PA (US); Yuanqiu Luo, Cranbury, NJ (US); Andy Shen, Basking Ridge, NJ (US)

(73) Assignee: Huawei Technologies Co., Ltd., Shenzhen (CN)

( * ) Notice: Subject to any disclaimer, the term of this patent is extended or adjusted under 35 U.S.C. 154(b) by 279 days.

(21) Appl. No.: 18/590,719

(22) Filed: Feb. 28, 2024

(65) Prior Publication Data

US 2024/0204904 A1 Jun. 20, 2024

Related U.S. Application Data

(63) Continuation of application No. PCT/US2022/016773, filed on Feb. 17, 2022.

(51) Int. Cl.
*H04J 14/02* (2006.01)

(52) U.S. Cl.
CPC ................................ *H04J 14/0238* (2013.01)

(58) Field of Classification Search
CPC ........ H04J 1/04; H04J 1/02; H04J 3/06; H04J 3/07; H04J 3/24; H04J 3/26; H04J 7/02; H04J 14/02; H04J 13/18; H04J 13/16; H04J 13/10
See application file for complete search history.

(56) References Cited

U.S. PATENT DOCUMENTS

| | | | | |
|---|---|---|---|---|
| 7,818,389 B1* | 10/2010 | Chiang | .................... | H01M 4/92 709/212 |
| 9,225,453 B2* | 12/2015 | Fang | .................... | H04B 10/516 |
| 2003/0133460 A1* | 7/2003 | Lee | ........................ | H04J 3/0682 370/395.51 |
| 2004/0109689 A1* | 6/2004 | Song | .................. | H04Q 11/0067 398/69 |
| 2004/0252714 A1* | 12/2004 | Oh | ..................... | H04Q 11/0067 370/437 |

(Continued)

OTHER PUBLICATIONS

K.A. Mat Sharif et al., "Demonstration of XGS-PON and GPON Co-Existing in the Same Passive Optical Network," Nov. 15, 2018,2018 IEEE 7th International Conference on Photonics (ICP),pp. 1-3.*

(Continued)

*Primary Examiner* — Omar S Ismail
(74) *Attorney, Agent, or Firm* — Conley Rose, P.C.

(57) ABSTRACT

An OLT comprises: a memory configured to store instructions; and at least one processor coupled to the memory and configured to execute the instructions to cause the OLT to: exchange WDM communications between first ONUs of a first kind and second ONUs of a second kind to enable transmission by the first ONUs and the second ONUs in different wavelength bands; perform identification of interfering first ONUs and susceptible second ONUs; and generate, based on the identification, a schedule of coordinated transmission of the first ONUs and the second ONUs to reduce interference between the first ONUs and the second ONUs.

20 Claims, 11 Drawing Sheets

(56) References Cited

U.S. PATENT DOCUMENTS

| | | | | |
|---|---|---|---|---|
| 2007/0122151 | A1* | 5/2007 | Watanabe | H04J 3/1694 398/69 |
| 2007/0133988 | A1* | 6/2007 | Kim | H04J 14/0252 398/69 |
| 2008/0138064 | A1* | 6/2008 | O'Byrne | H04J 3/1694 398/25 |
| 2008/0279554 | A1* | 11/2008 | Kazawa | H04Q 11/0067 398/69 |
| 2009/0080889 | A1* | 3/2009 | Nozue | H04J 14/0232 398/72 |
| 2009/0175622 | A1* | 7/2009 | Lee | H04Q 11/0067 398/79 |
| 2009/0202245 | A1* | 8/2009 | Bouda | H04J 14/025 398/76 |
| 2009/0245790 | A1* | 10/2009 | Mizutani | H04J 3/0682 398/43 |
| 2010/0028002 | A1* | 2/2010 | Qian | H04Q 11/0067 398/79 |
| 2010/0034534 | A1* | 2/2010 | Niibe | H04J 14/0252 398/25 |
| 2010/0067913 | A1* | 3/2010 | Niibe | H04B 10/70 398/98 |
| 2010/0142944 | A1* | 6/2010 | Zou | H04Q 11/0067 398/58 |
| 2010/0322634 | A1* | 12/2010 | Murayama | H04L 47/762 398/98 |
| 2011/0211827 | A1* | 9/2011 | Soto | H04J 14/0279 398/25 |
| 2012/0093500 | A1* | 4/2012 | Shiba | H04J 14/0246 370/293 |
| 2013/0230324 | A1* | 9/2013 | Gupta | H04L 12/2885 398/43 |
| 2013/0308937 | A1* | 11/2013 | Pohlmann | H04J 14/0282 398/25 |
| 2014/0178076 | A1* | 6/2014 | Fang | H04J 14/0238 398/98 |
| 2014/0233944 | A1* | 8/2014 | Vetter | H04J 14/0256 398/67 |
| 2014/0341574 | A1* | 11/2014 | Yan | H04J 14/0265 398/49 |
| 2015/0093108 | A1* | 4/2015 | Hirth | H04Q 11/0067 398/34 |
| 2015/0318930 | A1* | 11/2015 | Grobe | H04J 14/0307 398/79 |
| 2016/0134953 | A1* | 5/2016 | Kramer | H04Q 11/0067 398/45 |
| 2016/0269105 | A1* | 9/2016 | Yoshida | H04B 10/032 |
| 2020/0296487 | A1* | 9/2020 | Bonk | H04J 14/0221 |

OTHER PUBLICATIONS

Samy Ghoniemy,"Enhanced Time and Wavelength Division Multiplexed Passive Optical Network (TWDM-PON) for Triple-play Broadband Service Delivery in FTTx," Sep. 13, 2018, 2018 International Conference on Computer and Applications (ICCA), p. 419-424.*

Yuanqiu Lou et al.,"PON Coexistence Interference Avoidance with Cross-Layer Design," Aug. 17, 2022,2022 27th OptoElectronics and Communications Conference (OECC) and 2022 International Conference on Photonics in Switching and Computing (PSC), pp. 1-4.*

Amitabha Banerjee,"Wavelength-division-multiplexed passive optical network (WDM-PON) technologies for broadband access: a review," Oct. 27, 2005, Journal of Optical Networking, Nov. 2005, vol. 4, No. 11,pp. 737-755.*

Jiawei Zhang et al.,"Reconfigurable Optical Mobile Fronthaul Networks for Coordinated Multipoint Transmission and Reception in 5G," May 23, 2017, vol. 9, No. 6/Jun. 2017/J. Opt. Commun. Network,pp. 489-492.*

Dezhi Zhang et al.,"Progress of ITU-T higher speed passive optical network (50G-PON) standardization," Jun. 24, 2020, Journal of Optical Communications and Networking,vol. 12,No. 10, pp. D99-D104.*

Sharif, et al., "Demonstration of XGS-PON and GPON Co-Existing in the Same Passive Optical Network," 2018 IEEE 7th International Conference on Photonics (ICP), IEEE, Apr. 9, 2018, pp. 1-3, XP033446417.

Luo, et al., "PON Coexistence Interference Avoidance with Cross-Layer Design," 2022 27th Optoelectronics and Communications Conference (OECC) and 2022 International Conference on Photonics in Switching and Computing (PSC), IEICE, Jul. 3, 2022, pp. 1-3, XP34165934.

"Coexistence of Passive Optical Network Systems; G.9805 (Feb. 2022)," Series G: Transmission Systems and Media, Digital Systems and Networks, Access Networks—Optical Line Systems for Local and Access Network, ITU-T Standard G.9805, International Telecommunication Union, Geneva; CH, Feb. 13, 20222, pp. 1-44, XP044332664.

Effenberger, et al., "Discussion on Coexistence Crosstalk Mitigation," International Telecommunication Union, Telecommunication Standardization Sector, SG15-Cxxx, Study Group 15, Question 2/15, E-meeting, Mar. 29-31, 2022, 2 pages.

Effenberger, "Second Draft of New Appendix V of G.9805," Rapporteur Group Meeting—Contribution, International Telecommunication Union, Telecommunication Standardization Sector, Dxx, Study Group 15, Question 2/15, E-meeting, Jul. 24-27, 2022, 11 pages.

"Coexistence of Passive Optical Network Systems," International Telecommunication Union, Standardization Sector, Recommendation ITU-T G.9805 (2022) Amd. 1 (Jun. 2023), Series G: Transmission Systems and Media, Digital Systems and Networks, Access Networks—Optical Line Systems for Local and Access Networks, Jun. 2023, 64 pages.

* cited by examiner

500

| | XGS1 | XGS2 | XGS3 | XGS4 | XGS5 | XGS6 | XGS7 | XGS8 |
|---|---|---|---|---|---|---|---|---|
| G1 | $1e^{-2}$ | $1e^{-5}$ | $2e^{-4}$ | $7e^{-4}$ | $1e^{-2}$ | $4e^{-7}$ | 0 | 0 |
| G2 | $8e^{-3}$ | $3e^{-4}$ | $6e^{-5}$ | $4e^{-4}$ | $9e^{-3}$ | $3e^{-6}$ | 0 | 0 |
| G3 | $6e^{-3}$ | $7e^{-4}$ | $3e^{-4}$ | $7e^{-5}$ | $5e^{-3}$ | $1e^{-5}$ | $2e^{-5}$ | $7e^{-6}$ |
| G4 | $8e^{-4}$ | $3e^{-4}$ | $7e^{-3}$ | $1e^{-5}$ | $2e^{-4}$ | $3e^{-4}$ | $3e^{-6}$ | 0 |
| G5 | $1e^{-5}$ | $2e^{-4}$ | $3e^{-4}$ | $3e^{-4}$ | $6e^{-5}$ | $1e^{-4}$ | $1e^{-5}$ | $2e^{-6}$ |
| G6 | $3e^{-4}$ | $6e^{-5}$ | $1e^{-4}$ | $8e^{-5}$ | $3e^{-4}$ | $7e^{-6}$ | $3e^{-5}$ | $6e^{-5}$ |

FIG. 5

600

| | XGS1 | XGS2 | XGS3 | XGS4 | XGS5 | XGS6 | XGS7 | XGS8 |
|---|---|---|---|---|---|---|---|---|
| G1 | ERROR | | | ERROR | ERROR | | | |
| G2 | ERROR | | | | ERROR | | | |
| G3 | ERROR | ERROR | | | ERROR | | | |
| G4 | ERROR | | | | | | | |
| G5 | | | | | | | | |
| G6 | | | | | | | | |

FIG. 6

| | XGS3 | XGS6 | XGS7 | XGS8 | XGS2 | XGS4 | XGS5 | XGS1 |
|---|---|---|---|---|---|---|---|---|
| G3 | | | | | ERROR | | ERROR | ERROR |
| G2 | | | | | | | ERROR | ERROR |
| G1 | | | | | | ERROR | ERROR | ERROR |
| G4 | | | | | | | | ERROR |
| G5 | | | | | | | | |
| G6 | | | | | | | | |

900

| | | XGS3 | XGS6 | XGS7 | XGS8 | XGS2 | XGS4 | XGS5 | XGS1 |
|---|---|---|---|---|---|---|---|---|---|
| | RSSI | -26 | -24 | -23.5 | -20.5 | -18 | -17 | -14 | -14 |
| G3 | -30 | | | | | ERROR | | ERROR | ERROR |
| G2 | -29.5 | | | | | | | ERROR | ERROR |
| G1 | -29 | | | | | | ERROR | ERROR | ERROR |
| G4 | -26 | | | | | | | | ERROR |
| G5 | -20 | | | | | | | | |
| G6 | -15 | | | | | | | | |

FIG. 9

1000

| | | XGS3 | XGS6 | XGS7 | XGS8 | XGS2 | XGS4 | XGS5 | XGS1 |
|---|---|---|---|---|---|---|---|---|---|
| | RSSI | -26 | -24 | -23.5 | -20.5 | -18 | -17 | -14 | -14 |
| G3 | -30 | | | | | ERROR | | ERROR | ERROR |
| G2 | -29.5 | | | | | | | ERROR | ERROR |
| G1 | -29 | | | | | | ERROR | ERROR | ERROR |
| G4 | -26 | | | | | | | | ERROR |
| G5 | -20 | | | | | | | | |
| G6 | -15 | | | | | | | | |

FIG. 10

1100

| | | XGS3 | XGS6 | XGS7 | XGS8 | XGS2 | XGS4 | XGS5 | XGS1 |
|---|---|---|---|---|---|---|---|---|---|
| | RSSI | -26 | -24 | -23.5 | -20.5 | -18 | -17 | -14 | -14 |
| G3 | -30 | | | | | ERROR | | ERROR | ERROR |
| G2 | -29.5 | | | | | | | ERROR | ERROR |
| G1 | -29 | | | | | | ERROR | ERROR | ERROR |
| G4 | -26 | | | | | | | | ERROR |
| G5 | -20 | | | | | | | | |
| G6 | -15 | | | | | | | | |

FIG. 11

1300

| | | XGS3 | XGS6 | XGS7 | XGS8 | XGS2 | XGS4 | XGS5 | XGS1 |
|---|---|---|---|---|---|---|---|---|---|
| | RSSI | -26 | -24 | -23.5 | -20.5 | -18 | -17 | -14 | -14 |
| G3 | -30 | | | | | ERROR | | ERROR | ERROR |
| G2 | -29.5 | | | | | | | ERROR | ERROR |
| G1 | -29 | | | | | | ERROR | ERROR | ERROR |
| G4 | -26 | | | | | | | | ERROR |
| G5 | -20 | | | | | | | | |
| G6 | -15 | | | | | | | | |

FIG. 13

1400

| | | XGS3 | XGS6 | XGS8 | XGS7 | XGS2 | XGS4 | XGS5 | XGS1 |
|---|---|---|---|---|---|---|---|---|---|
| | | -26 | -24 | -23.5 | -20.5 | -18 | -17 | -14 | -14 |
| G3 | -30 | | | | | ERROR | | ERROR | ERROR |
| G2 | -29.5 | | | | | | | ERROR | ERROR |
| G1 | -29 | | | | | T1 | ERROR | ERROR | ERROR |
| G4 | -26 | | | | | | T2 | | ERROR |
| G5 | -20 | | | | | | | | |
| G6 | -15 | | | | | | | | |

FIG. 14

1500

| | | XGS3 | XGS6 | XGS8 | XGS7 | XGS2 | XGS4 | XGS5 | XGS1 |
|---|---|---|---|---|---|---|---|---|---|
| | | -26 | -24 | -23.5 | -20.5 | -18 | -17 | -14 | -14 |
| G3 | -30 | | | | | ERROR | | ERROR | ERROR |
| G2 | -29.5 | | | | | | | ERROR | ERROR |
| G1 | -29 | | | | | | ERROR | ERROR | ERROR |
| G4 | -26 | | | | | $\frac{T1+T2}{2}$ | | | ERROR |
| G5 | -20 | | | | | | | | |
| G6 | -15 | | | | | | | | |

FIG. 15

COORDINATED TRANSMISSION IN MULTI-PASSIVE OPTICAL NETWORK (PON) SYSTEMS

CROSS-REFERENCE TO RELATED APPLICATIONS

This is a continuation of Int'l Patent App. No. PCT/US2022/016773 filed on Feb. 17, 2022, which is incorporated herein by reference.

TECHNICAL FIELD

The disclosed embodiments relate to optical networks in general and coordinated transmission in multi-PON systems in particular.

BACKGROUND

Optical networks are networks that use optical signals to carry data. Light sources such as lasers generate optical signals. Modulators modulate the optical signals with data to generate modulated optical signals. Various components transmit, propagate, amplify, receive, and process the modulated optical signals. Optical networks may implement multiplexing to achieve high bandwidths. Optical networks implement data centers, metropolitan networks, PONs, long-haul transmission systems, and other applications.

SUMMARY

A first aspect relates to an OLT comprising: a memory configured to store instructions; and at least one processor coupled to the memory and configured to execute the instructions to cause the OLT to: exchange WDM communications between first ONUs of a first kind and second ONUs of a second kind to enable transmission by the first ONUs and the second ONUs in different wavelengths bands; perform identification of interfering first ONUs and susceptible second ONUs; and generate, based on the identification, a schedule of coordinated transmission of the first ONUs and the second ONUs to reduce interference between the first ONUs and the second ONUs.

In a first implementation form of the first aspect, the first ONUs are either XGS-PON ONUs or XG-PON ONUs.

In a second implementation form of the first aspect or any preceding implementation of the first aspect, the second ONUs are G-PON ONUs.

In a third implementation form of the first aspect or any preceding implementation of the first aspect, the schedule is based on dynamic bandwidth allocation (DBA).

In a fourth implementation form of the first aspect or any preceding implementation of the first aspect, the schedule schedules least-interfering first ONUs first in a DBA cycle, medium-interfering first ONUs second in the DBA cycle, and most-interfering first ONUs last in the DBA cycle.

In a fifth implementation form of the first aspect or any preceding implementation of the first aspect, the schedule schedules most-susceptible second ONUs first in the DBA cycle, medium-susceptible second ONUs second in the DBA cycle, and least-susceptible second ONUs last in the DBA cycle.

In a sixth implementation form of the first aspect or any preceding implementation of the first aspect, the OLT further comprises a transmitter configured to transmit the schedule to the first ONUs and the second ONUs.

In a seventh implementation form of the first aspect or any preceding implementation of the first aspect, the at least one processor is further configured to execute the instructions to cause the OLT to: perform interference testing between the first ONUs and the second ONUs; determine an interference level generated by the first ONUs based on the interference testing; and determine a susceptibility level of the second ONUs to interference from the first ONUs based on the interference testing.

In an eighth implementation form of the first aspect or any preceding implementation of the first aspect, the interference testing is between every combination of the first ONUs and the second ONUs.

In a ninth implementation form of the first aspect or any preceding implementation of the first aspect, the interference testing is based on correlated interference testing.

In a tenth implementation form of the first aspect or any preceding implementation of the first aspect, the interference testing is based on set-wise interference testing.

In an eleventh implementation form of the first aspect or any preceding implementation of the first aspect, the at least one processor is further configured to execute the instructions to cause the OLT to perform the identification by: determining a first ranking of the first ONUs based on the interference level of the first ONUs; and determining a second ranking of the second ONUs based on the susceptibility level of the second ONUs.

In a twelfth implementation form of the first aspect or any preceding implementation of the first aspect, the identification is based on RSSIs of the first ONUs and the second ONUs.

A second aspect relates to a method implemented by an OLT and comprising: exchanging WDM communications between first ONUs of a first kind and second ONUs of a second kind to enable transmission by the first ONUs and the second ONUs in different wavelengths bands; performing identification of interfering first ONUs and susceptible second ONUs; and generating, based on the identification, a schedule of coordinated transmission of the first ONUs and the second ONUs to reduce interference between the first ONUs and the second ONUs.

In a first implementation form of the second aspect, the first ONUs are either XGS-PON ONUs or XG-PON ONUs, and wherein the second ONUs are G-PON ONUs.

In a second implementation form of the second aspect or any preceding implementation of the first aspect, the schedule is based on DBA, wherein the schedule schedules least-interfering first ONUs first in a DBA cycle, medium-interfering first ONUs second in the DBA cycle, and most-interfering first ONUs last in the DBA cycle, and wherein the schedule schedules most-susceptible second ONUs first in the DBA cycle, medium-susceptible second ONUs second in the DBA cycle, and least-susceptible second ONUs last in the DBA cycle.

In a third implementation form of the second aspect or any preceding implementation of the first aspect, the method further comprises: performing interference testing between the first ONUs and the second ONUs, wherein the interference testing is between every combination of the first ONUs and the second ONUs, based on correlated interference testing, or based on set-wise interference testing; determining an interference level generated by the first ONUs, based on the interference testing; and determining a susceptibility level of the second ONUs to interference from the first ONUs, based on the interference testing.

In a fourth implementation form of the first aspect or any preceding implementation of the first aspect, the method further comprises further performing the identification by: determining a first ranking of the first ONUs based on the interference level of the first ONUs; and determining a second ranking of the second ONUs based on the susceptibility level of the second ONUs.

In a fifth implementation form of the second aspect or any preceding implementation of the first aspect, the identification is based on RSSIs of the first ONUs and the second ONUs.

A third aspect relates to a computer program product comprising instructions that are stored on a computer-readable medium and that, when executed by at least one processor, cause an OLT to: exchange WDM communications between first ONUs of a first kind and second ONUs of a second kind to enable transmission by the first ONUs and the second ONUs in different wavelength bands; perform identification of interfering first ONUs and susceptible second ONUs; and generate, based on the identification, a schedule of coordinated transmission of the first ONUs and the second ONUs to reduce interference between the first ONUs and the second ONUs.

Any of the above embodiments may be combined with any of the other above embodiments to create a new embodiment. These and other features will be more clearly understood from the following detailed description taken in conjunction with the accompanying drawings and claims.

BRIEF DESCRIPTION OF THE DRAWINGS

For a more complete understanding of this disclosure, reference is now made to the following brief description, taken in connection with the accompanying drawings and detailed description, wherein like reference numerals represent like parts.

FIG. 5 is a table of bit error rates (BERs) for each combination of G-PON ONU and XGS-PON ONU.

FIG. 6 is a table identifying interfering XGS-PON ONUs and susceptible G-PON ONUs.

FIG. 9 is a table identifying interfering XGS-PON ONUs and susceptible G-PON ONUs.

FIG. 10 is a table demonstrating correlated interference testing.

FIG. 11 is a table demonstrating set-wise interference testing.

FIG. 13 is a table demonstrating continued set-wise interference testing.

FIG. 14 is a table demonstrating conflict between two ONUs.

FIG. 15 is a table demonstrating conflict resolution between two ONUs.

DETAILED DESCRIPTION

It should be understood at the outset that, although an illustrative implementation of one or more embodiments are provided below, the disclosed systems and/or methods may be implemented using any number of techniques, whether currently known or in existence. The disclosure should in no way be limited to the illustrative implementations, drawings, and techniques illustrated below, including the exemplary designs and implementations illustrated and described herein, but may be modified within the scope of the appended claims along with their full scope of equivalents.

The following abbreviations apply:

ASE: amplified spontaneous emission
ASIC: application-specific integrated circuit
BER: bit error rate
CE: coexistence
CO: central office
CPU: central processing unit
DBA: dynamic bandwidth allocation
dB: decibel(s)
dBm: decibel-milliwatt(s)
DS: downstream
DSP: digital signal processor
EO: electrical-to-optical
FPGA: field-programmable gate array
G: gigabit(s) per second
G-PON: gigabit-capable PON
MAC: medium access controller
nm: nanometer(s)
ODN: optical distribution network
OE: optical-to-electrical
OLT: optical line terminal
ONT: optical network terminal
ONU: optical network unit
PON: passive optical network
P2MP: point-to-multipoint
RAM: random-access memory
RF: radio frequency
ROM: read-only memory
RSSI: received signal strength indicator
RX: receiver unit
SRAM: static RAM
t: time
TCAM: ternary content-addressable memory
TX: transmitter unit
US: upstream
WDM: wavelength-division multiplexing
XG-PON: 10-gigabit-capable PON
XGS-PON: 10-gigabit-capable symmetric PON.

Figure 1:
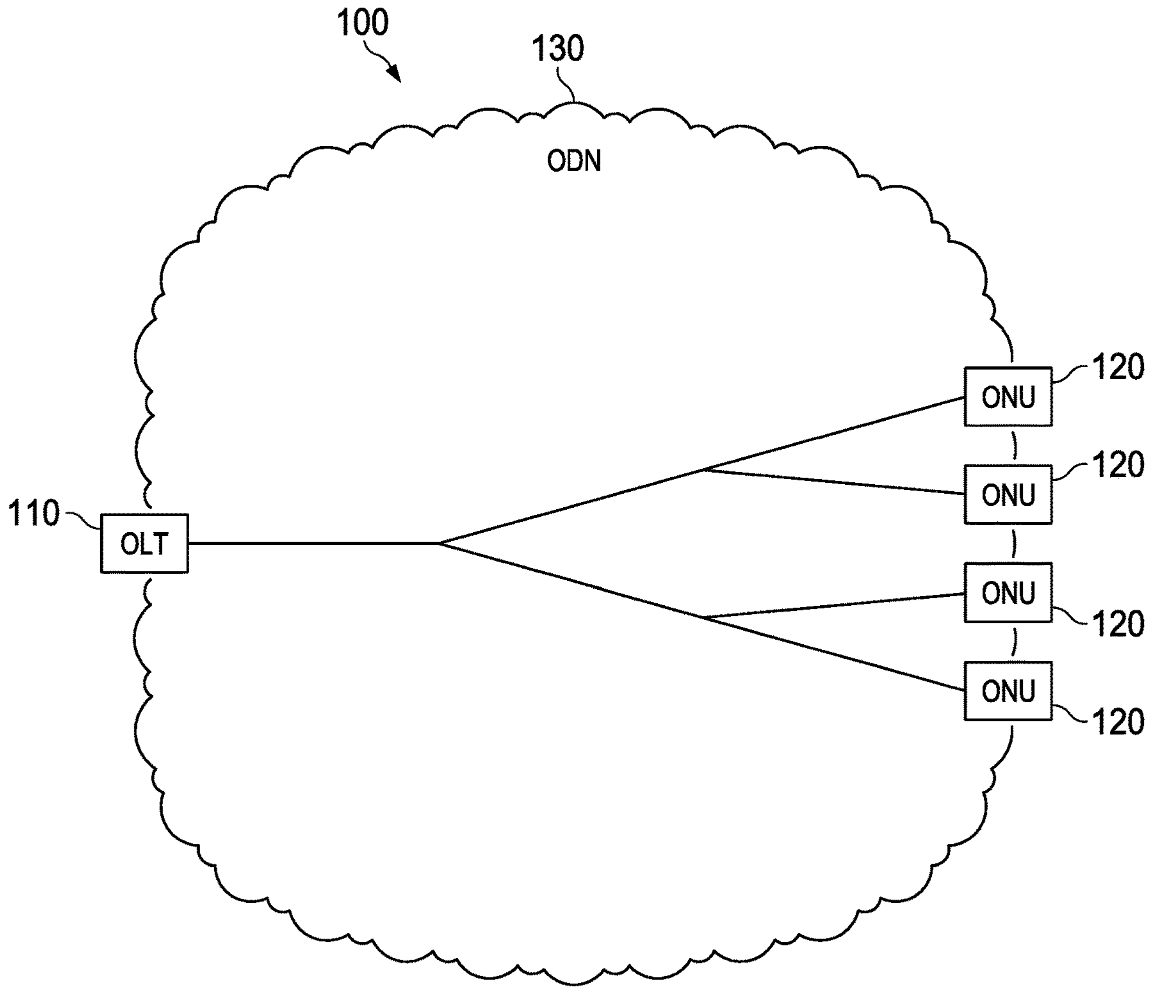
FIG. 1 is a diagram of a PON according to an embodiment.

FIG. 1 is a diagram of a PON 100 according to an embodiment. The PON 100 comprises an OLT 110, one or more ONUs 120, and an ODN 130 that couples the OLT 110 to the ONUs 120. The PON 100 is a communications network that may not require active components to distribute data between the OLT 110 and the ONUs 120. Instead, the PON 100 may use passive optical components in the ODN 130 to distribute the data.

The OLT 110 communicates with another network (or networks) and the ONUs 120. For instance, the OLT 110 forwards data from the other network to the ONUs 120 and forwards data from the ONUs 120 to the other network. The OLT 110 is typically located at a central location such as a CO, but it may also be located at other suitable locations.

The ODN 130 is a data distribution network that comprises optical fiber cables, couplers, splitters, distributors, and other suitable components. The components include passive optical components that do not require power to distribute data between the OLT 110 and the ONUs 120. The ODN 130 may extend from the OLT 110 to the ONUs 120 in a branching configuration as shown or may be configured in any other suitable P2MP configuration.

The ONUs 120 communicate with the OLT 110 and customers. For instance, the ONUs 120 forward data from the OLT 110 to the customers and forward data from the customers (i.e., users) to the OLT 110. ONUs 120 and ONTs are similar, and the terms may be used interchangeably. The ONUs 120 are typically located at distributed locations such as customer premises, but they may also be located at other suitable locations.

Figure 2:
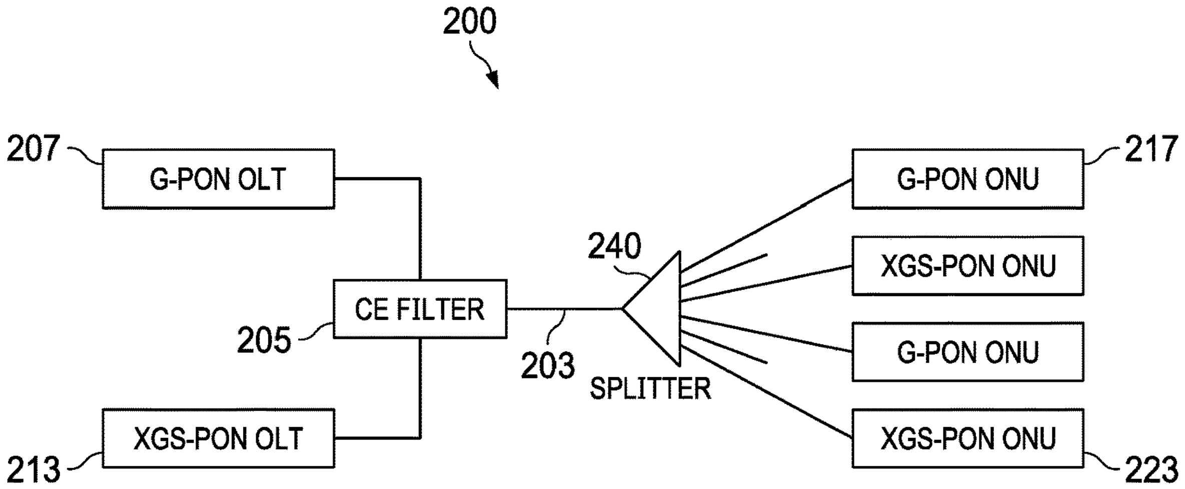
FIG. 2 is a diagram of a multi-PON system according to an embodiment.

FIG. 2 is a diagram of a multi-PON system 200 according to an embodiment. The multi-PON system 200 is similar to the PON 100. However, unlike the PON 100, the multi-PON system 200 in the embodiment shown comprises a feeder fiber 203; a CE filter 205; two OLTs comprising a G-PON OLT 207 and an XGS-PON OLT 213 instead of a single OLT; a splitter 240; and comprises two different kinds, or types, of ONUs, G-PON ONUs 217 and XGS-PON ONUs 223.

The CE filter 205 routes signals to and from the feeder fiber 203 to the G-PON OLT 207 and the XGS-PON OLT 213. Though the G-PON OLT 207 and the XGS-PON OLT 213 are shown, they may be based on other optical networking technologies, such as XG-PON. Though different, XG-PON and XGS-PON are interchangeably referred to as "XGS-PON." The G-PON OLT 207 and the XGS-PON OLT 213 may be separate devices or a single device that implements both kinds of OLTs. The G-PON OLT 207 and the XGS-PON OLT 213 coordinate with each other to implement WDM communications. The splitter 240 distributes signals to, and collects signals from, the G-PON ONUs 217 and the XGS-PON ONUs 223. The G-PON ONUs 217 correspond to the G-PON OLT 207, and the XGS-PON ONUs 223 correspond to the XGS-PON OLT 213. Alternatively, the G-PON ONUs 217 and the XGS-PON ONUs 223 are based on other optical networking technologies such as XG-PON.

Together, the feeder fiber 203, the CE filter 205, the G-PON OLT 207, the splitter 240, the G-PON ONUs 217, and other related components may be referred to as a G-PON. Likewise, the feeder fiber 203, the CE filter 205, the XGS-PON OLT 213, the splitter 240, the XGS-PON ONUs 223, and other related components may be referred to as an XGS-PON. Together, the G-PON and the XGS-PON share the feeder fiber 203, the CE filter 205, and the splitter 240 and form the multi-PON system 200.

Figure 3:
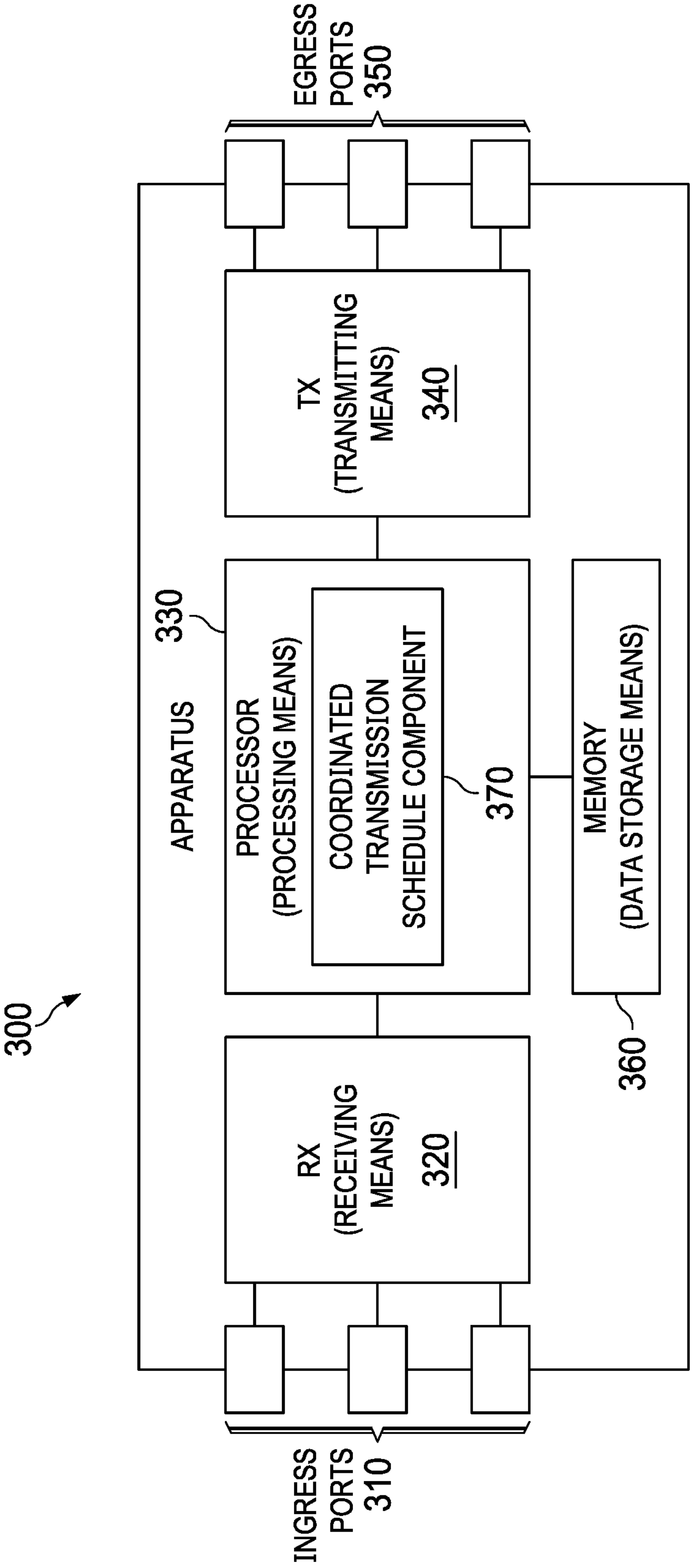
FIG. 3 is a diagram of an apparatus according to an embodiment.

FIG. 3 is a diagram of an apparatus 300 according to an embodiment. The apparatus 300 may implement the embodiments. The apparatus 300 comprises ingress ports 310 and a receiver (RX) 320 or receiving means to receive data; a processor 330 or processing means, logic unit, baseband unit, or CPU, to process the data; a transmitter (TX) 340 or transmitting means, egress ports 350 to transmit the data; and a memory 360 or data storage means to store the data. The receiver (RX) 320 is coupled to the ingress ports 310, the processor 330 is coupled to the receiver (RX) 320, the transmitter (TX) 340 is coupled to the processor 330, the egress ports 350 are coupled to the transmitter (TX) 340, and the memory 360 is coupled to the processor 330. The apparatus 300 may also comprise OE components, EO components, or RF components coupled to the ingress ports 310, the RX 320, the TX 340, and the egress ports 350 to provide ingress or egress of optical signals, electrical signals, or RF signals.

The processor 330 is any combination of hardware, middleware, firmware, or software. The processor 330 comprises any combination of one or more CPU chips, cores, FPGAs, ASICs, or DSPs. The processor 330 communicates with the ingress ports 310, the RX 320, the TX 340, the egress ports 350, and the memory 360. The processor 330 comprises a coordinated transmission scheduling component 370, i.e., a software or instructions, which implements the embodiments. The inclusion of the coordinated transmission scheduling component 370 therefore provides a substantial improvement to the functionality of the apparatus 300 and effects a transformation of the apparatus 300 to a different state. Alternatively, the memory 360 stores the coordinated transmission scheduling component 370 as instructions, and the processor 330 executes those instructions.

The memory 360 comprises any combination of disks, tape drives, or solid-state drives. The apparatus 300 may use the memory 360 as an over-flow data storage device to store programs when the apparatus 300 selects those programs for execution and to store instructions and data that the apparatus 300 reads during execution of those programs. The memory 360 may store additional or other data not mentioned herein. The memory 360 may be volatile or non-volatile and may be any combination of ROM, RAM, TCAM, or SRAM, for example.

A computer program product may comprise computer-executable instructions that are stored on a computer-readable medium and that, when executed by a processor, cause an apparatus to perform the embodiments. The computer-readable medium may be the memory 360 or a portion of the processor 330, the processor may be the processor 330, and the apparatus may be the apparatus 300.

Figure 18:
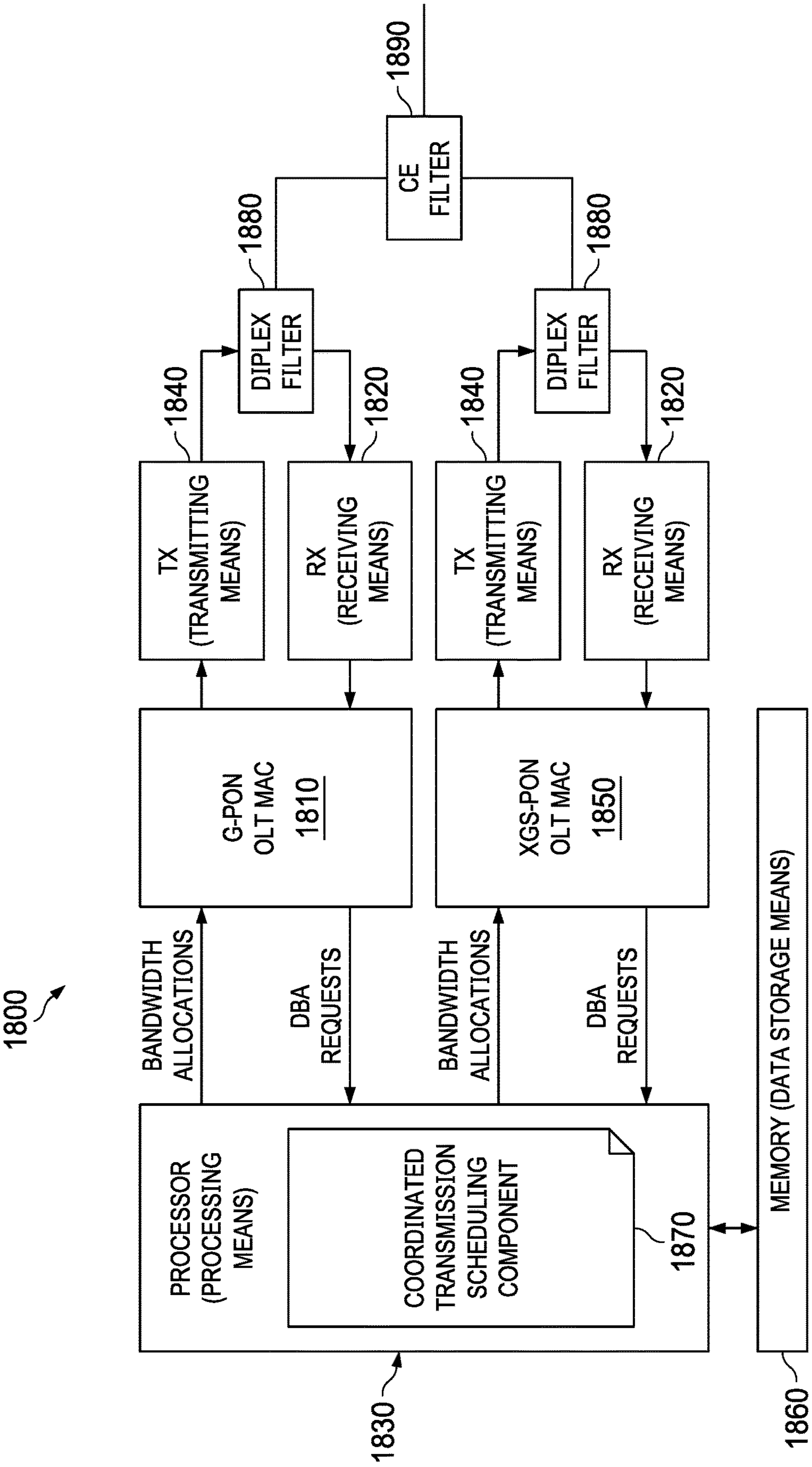
FIG. 18 is a diagram of an apparatus according to an embodiment.

FIG. 18 is a diagram of an apparatus 1800 according to an embodiment. The apparatus 1800 may implement the G-PON OLT 207, the XGS-PON OLT 213, or a combination of the G-PON OLT 207 and the XGS-PON OLT 213. Alternatively, components of the apparatus 1800 may be in separate devices. The apparatus 1800 is similar to the apparatus 300 in FIG. 3. The apparatus 1800 comprises RXs or receiving means 1820, a processor or processing means 1830, TXs or transmitting means 1840, a memory or data storage means 1860; and a coordinated transmission scheduling component 1870, which are similar to the RX 320, processor 330, TX 340, memory 360, and coordinated transmission scheduling component 370, respectively. However, unlike the apparatus 300, the apparatus 1800 further comprises a G-PON OLT MAC 1810, an XGS-PON OLT MAC 1850, diplex filters 1880, and a CE filter 1890.

The G-PON OLT MAC 1810 interfaces with a fiber via a first TX 1840, a first RX 1820, a first diplex filter 1880, and the CE filter 1890. The XGS-PON OLT MAC 1850 interfaces with the fiber via a second TX 1840, a second RX 1820, a second diplex filter 1880, and the CE 1890. In one approach, the G-PON OLT MAC 1810 and the XGS-PON OLT MAC 1850 implement DBA by receiving upstream bandwidth requests from subtending G-PON ONUs 217 and XGS-PON ONUs 223, calculating appropriate bandwidth allocations for those G-PON ONUs 217 and XGS-PON ONUs 223, and then transmitting the bandwidth allocations downstream. However, in a coordinated transmission scheduling system, the G-PON OLT MAC 1810 and the XGS-PON OLT MAC 1850 exchange DBA information with a common processor, in this case the processor 1830. The processor 1830, the G-PON OLT 207, and the XGS-PON OLT 213 may be separate components in the apparatus 1800 or may be in separate devices; or the processor 1830 may be in either the G-PON OLT 207 or the XGS-PON OLT 213, which are separate devices. The DBA information can be in various forms, including raw bandwidth requests or non-coordinated DBA results. The processor 330 or 1830 implements the coordinated transmission scheduling component 1870. The coordinated transmission scheduling component 1870, in turn, implements a coordinated transmission scheduling algorithm.

In this way, the multi-PON system 200 enables an operator to meet bandwidth requirements of users. For example, the operator may have already deployed the G-PON. The operator then deploys the XGS-PON on top of the G-PON in order to increase a bandwidth from 2.5 G to 10 G. The operator does so by supporting WDM communications, where WDM communications are exchanged between the XGS-PON ONUs 223 and the G-PON ONUs 217 to enable transmission by the XGS-PON ONUs 223 and the G-PON ONUs 217 in different wavelength bands. For example, the G-PON US wavelengths are in a 1,290-1,330 nm wavelength band, the G-PON DS wavelengths are in a 1,480-1,500 nm wavelength band, the XGS-PON US wavelengths are in a 1,260-1,280 nm wavelength band, and the XGS-PON DS wavelengths are in a 1,575-1,580 nm wavelength band.

The WDM works well when the G-PON loss budgets are class B or class C, which are 25 dB and 30 dB, respectively. However, when the G-PON loss budget is class C+, which is 32 dB, or higher, then the G-PON OLT 207 receives ASE optical noise light from the XGS-PON ONUs 223 due to a more sensitive, wide-bandwidth (e.g., 40 nm) receiver in the G-PON OLT 207. The ASE optical noise light coupled with a typical 20 dB PON dynamic loss range reduces performance of the G-PON OLT 207 so that the G-PON OLT 207 may not be able to support the class C loss budget.

Disclosed herein are embodiments for coordinated transmission in multi-PON systems. In the embodiments, an OLT schedules coordinated transmission between ONUs of different kinds, for instance G-PON ONUs and XGS-PON ONUs. The scheduling reduces interference at a receiver of the OLT. While G-PONs, XG-PONs, and XGS-PONs are discussed, the embodiments apply to any multi-PON systems.

Figure 4:
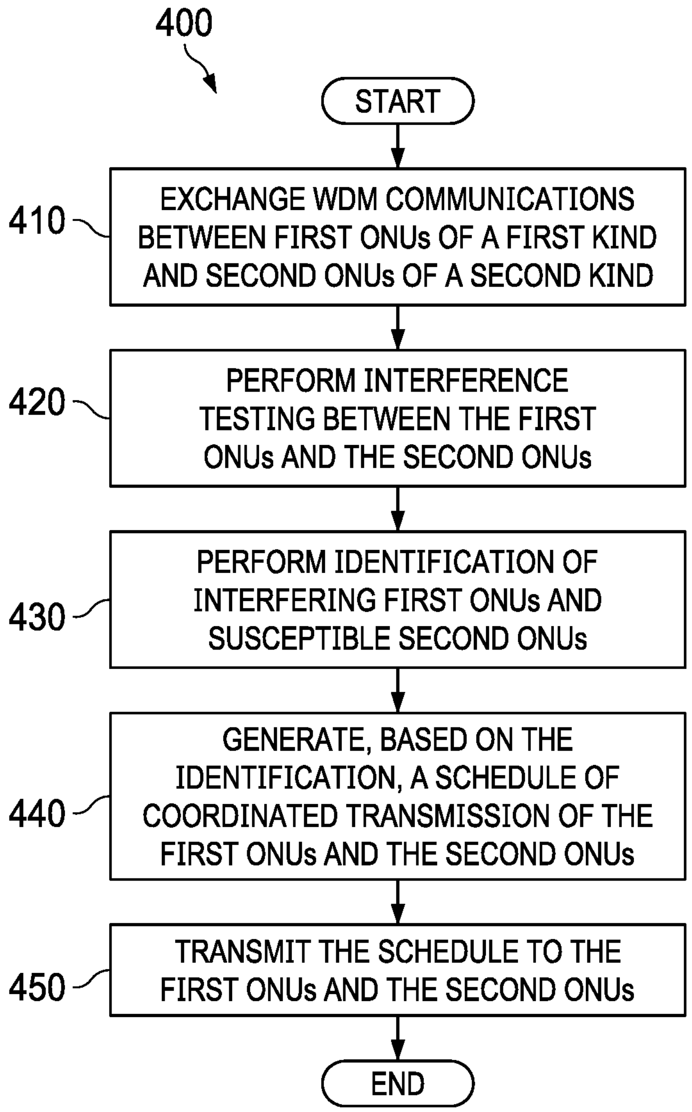
FIG. 4 is a flowchart illustrating a method of coordinated transmission according to an embodiment.

FIG. 4 is a flowchart illustrating a method 400 of coordinated transmission according to an embodiment. The processor 330 or 1830 performs the method 400. At step 410, WDM communications are supported between (and exchanged between) first ONUs of a first kind and second ONUs of a second kind, with the supporting including exchanging communications, data, or signals between the first ONUs of a first kind and the second ONUs of a second kind. The use of a WDM communications scheme enables transmission by the first ONUs and the second ONUs in different wavelength bands. For instance, the first ONUs are the XGS-PON ONUs 223, the first kind is XGS-PON, the second ONUs are the G-PON ONUs 217, and the second kind is G-PON. The G-PON OLT 207 supports WDM and exchanges WDM communications by coordinating with the XGS-PON OLT 213 and assigning the US and DS wavelengths to the G-PON ONUs 217 and the XGS-PON ONUs 223 as described above.

At step 420, interference testing between the first ONUs and the second ONUs is performed. The interference testing occurs before the G-PON ONUs 217 and the XGS-PON ONUs 223 begin user data (or traffic) communication. The processor 330 or 1830 instructs the G-PON ONUs 217 and the XGS-PON ONUs 223 to transmit at specific times so that every combination of G-PON ONU 217 and XGS-PON ONU 223 transmits at the same time. The processor 330 or 1830 detects errors at its receiver for each combination and records the results in its memory, for instance the memory 360. The results are shown in FIG. 5.

FIG. 5 is a table 500 of BERs for each combination of G-PON ONU 217 and XGS-PON ONU 223. In the table 500, the G-PON ONUs 217 are abbreviated as "G1," "G2," and so on in the left column; and the XGS-PON ONUs 223 are abbreviated as "XGS1," "XGS2," and so on in the top row. While 6 G-PON ONUs 217 and 8 XGS-PON ONUs 223 are shown throughout, the multi-PON system 200 may have any suitable number of G-PON ONUs 217 and XGS-PON ONUs 223. The table 500 shows how much interference the XGS-PON ONUs 223 generate based on the interference testing and how susceptible the G-PON ONUs 217 are to interference from the XGS-PON ONUs 223 based on the interference testing.

As shown, when G1 and XGS1 transmit at the same time, XGS1 causes a BER of $1e^{-2}$; when G2 and XGS2 transmit at the same time, XGS2 causes a BER of $3e^{-4}$; and so on. The variation in BERs is caused by multiple factors, including the relative signal strengths of the G-PON ONUs 217 and the XGS-PON ONUs 223 due to fiber lengths because some G-PON ONUs 217 and XGS-PON ONUs 223 are relatively farther from the G-PON OLT 207 and the XGS-PON OLT 213, the relative quality of transmitters in the G-PON ONUs 217 and the XGS-PON ONUs 223, the presence or lack of presence of filters in the G-PON ONUs 217 and the XGS-PON ONUs 223, other hardware variations in the G-PON ONUs 217 and the XGS-PON ONUs 223, and other environmental factors. While BER is discussed, the G-PON OLT 207 may use other error or interference metrics.

Returning to FIG. 4, at step 430, identification of interfering first ONUs and susceptible second ONUs is performed. Specifically, the processor 330 or 1830 determines a BER threshold. The BER threshold may be pre-stored in the processor 330 or 1830, in the memory 360 or 1860, or the processor 330 or 1830 may determine the threshold subsequent to deployment of the apparatus 300 or 1800. The threshold may be standardized or an industry norm. The processor 330 or 1830 applies that threshold to the table 500 to obtain FIG. 6.

FIG. 6 is a table 600 identifying interfering XGS-PON ONUs 223 and susceptible G-PON ONUs 217. In the table 600, the processor 330 or 1830 applies a BER threshold of $5e^{-4}$. The shaded cells indicate BERs that are higher than $5e^{-4}$ with the Boolean value "Error." Thus, the table 600 indicates that XGS1, XGS4, and XGS5 are interfering XGS-PON ONUs 223.

Specifically, XGS1 interferes with G1-G4, XGS2 interferes with G3, XGS4 interferes with G1, and XGS5 interferes with G1-G3. Likewise, the table 600 indicates that G1-G4 are susceptible G-PON ONUs 217. In this example, G1 is susceptible to interference from XGS1, XGS4, and XGS5; G2 is susceptible to interference from XGS1 and XGS5; G3 is susceptible to interference from XGS1-XGS2; and G4 is susceptible to interference from XGS1. For each combination of G-PON ONU 217 and XGS-PON ONU 223 causing the indicated error, the XGS-PON ONU 223 introduces noise that is too high for the G-PON OLT 207 to correctly receive US signals from the corresponding G-PON ONU 217.

Figures 7, 8:
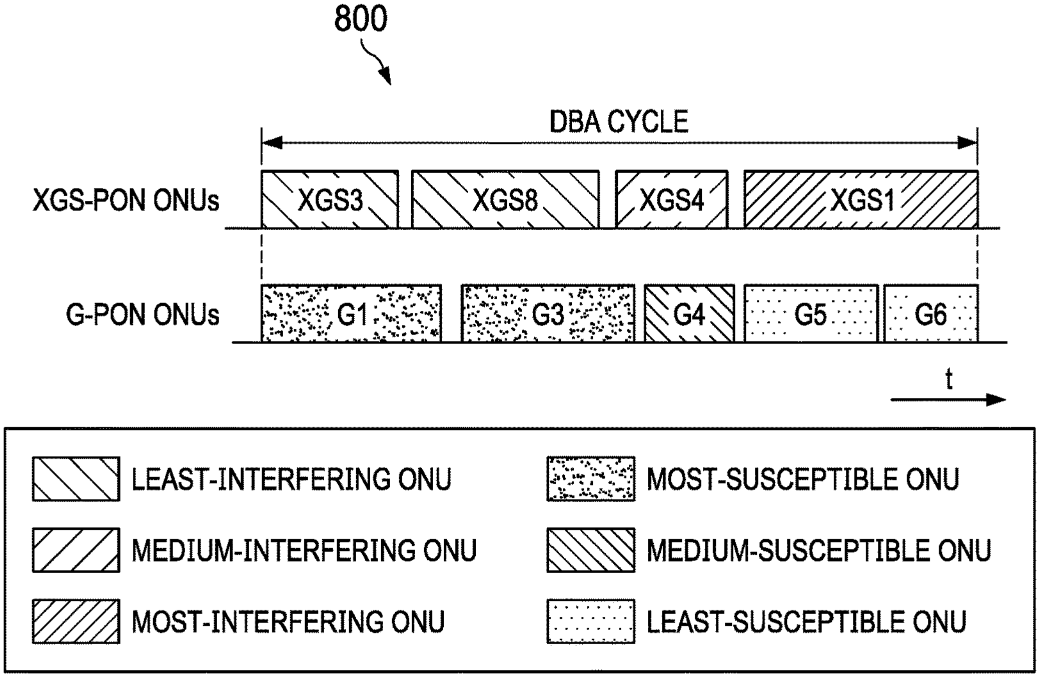
FIG. 7 is a table rearranging the "Error" cells in FIG. 6.
FIG. 8 is a high-level schedule of coordinated transmission.

FIG. 7 is a table 700 rearranging the "Error" cells in FIG. 6. To obtain the table 700, the processor 330 or 1830 rearranges the "Error" cells so that they are concentrated in the top-right corner. Because XGS1 interferes the most, it is in the last column of the table 700. Because XGS5 interferes the second-most, it is in the second-to-last column of the table 700. Because XGS2 and XGS4 interfere with only one G-PON ONU 217, they are respectively in the fourth-to-last column and third-to-last column of table 700. Thus, the table 700 provides a first ranking of the XGS-PON ONUs 223 based on how much interference they generate and a second ranking of the G-PON ONUs 217 based on how susceptible they are to interference from the XGS-PON ONUs 223.

Returning to FIG. 4, at step 440, a schedule of coordinated transmission of the first ONUs and the second ONUs is generated based on the identification. The schedule reduces interference between the first ONUs and the second ONUs. In the schedule, the processor 330 or 1830 does not permit an XGS-PON ONU 223 to transmit when that XGS-PON ONU 223 interferes with a G-PON ONU 217. FIG. 8 is an example of such a schedule.

FIG. 8 is a high-level schedule 800 of coordinated transmission. The high-level schedule 800 implements DBA of the XGS-PON ONUs first and DBA of the G-PON ONUs second. Specifically, the high-level schedule 800 schedules the least-interfering XGS-PON ONUs 223 first in a DBA cycle, the medium-interfering XGS-PON ONUs 223 second in the DBA cycle, and the most-interfering XGS-PON ONUs 223 last in the DBA cycle. As shown, the least-interfering XGS-PON ONUs 223 include XGS3 and XGS8, the medium-interfering XGS-PON ONUs 223 include XGS4, and the most-interfering XGS-PON ONUs 223 include XGS1. The high-level schedule 800 schedules most-susceptible G-PON ONUs 217 first in the DBA cycle, medium-susceptible G-PON ONUs 217 second in the DBA cycle, and least-susceptible G-PON ONUs 217 last in the DBA cycle. As shown, the most-susceptible G-PON ONUs 217 include G1 and G3, the medium-susceptible G-PON ONUs 217 include G4, and the least-susceptible G-PON ONUs 217 include G5-G6.

Returning to FIG. 4, at step 450, the schedule is transmitted to the first ONUs and the second ONUs. Specifically, the processor 330 or 1830 passes the schedule to the G-PON OLT MAC 1810 and the XGS-PON OLT MAC 1850, then the G-PON OLT 207 transmits the schedule to the G-PON ONUs 217 and the XGS-PON OLT 213 transmits the schedule to the XGS-PON ONUs 223.

I. Alternatives to Interference Testing Every Combination of ONUs

The interference testing described in step 420 of FIG. 4 above, which includes testing every combination of the G-PON ONUs 217 and the XGS-PON ONUs 223, causes the G-PON ONUs 217 and the XGS-PON ONUs 223 to experience significant downtime during which they cannot communicate user data. It is desirable to avoid or reduce that downtime. In addition, the processor 330 or 1830 has hardware limits that make such interference testing difficult. The following approaches address those issues.

A. RSSI Ranking

There is a strong correlation between RSSIs and errors so that G-PON ONU 217 and XGS-PON 223 combinations with higher differential RSSIs indicate G-PON ONUs 217 and XGS-PON ONUs 223 that are more likely to interfere or be susceptible to interference. The processor 330 or 1830 obtains RSSIs from each of the G-PON ONUs 217 and the XGS-PON ONUs 223 during initialization of the G-PON ONUs 217 and the XGS-PON ONUs 223. Based on the RSSIs, the processor 330 or 1830 generates the table in FIG. 9. The processor 330 or 1830 may use RSSIs instead of performing interference testing and therefore avoid G-PON ONU 217 and XGS-PON 223 downtime.

FIG. 9 is a table 900 identifying interfering XGS-PON ONUs 223 and susceptible G-PON ONUs 217. In the table 900, the processor 330 or 1830 ranks the G-PON ONUs 217 in the left column in ascending order of RSSI. Thus, G1, which has the lowest RSSI of −30 dBm, is first; and G6, which has the highest RSSI of −15 dBm, is last. The G-PON OLT 207 ranks the XGS-PON ONUs 223 in the top row in ascending order of RSSI. Thus, XGS3, which has the lowest RSSI of −26 dBm, is first; and XGS1, which has the highest RSSI of −14 dBm, is last.

After ranking G1-G6 and XGS1-XGS8 as described, the largest differential RSSIs concentrate in the upper-right portion of the table 900. For instance, the combination of G3 and XGS1 yields an RSSI differential of (−30)−(−14)=−16. In contrast the combination of G3 and XGS3 yields an RSSI differential of (−30)−(−26)=−4. As can be seen, the table 900 precisely corresponds with the table 700. Though the table 900 uses RSSIs, the processor 330 or 1830 may use other metrics that correlate to errors.

B. Correlated Interference Testing

The G-PON OLT 207 has one (1) register per G-PON ONU 217 to store error information. Thus, in the example shown, the G-PON OLT 207 has six (6) registers. However, the table 700 comprises 6×8=48 cells. Thus, the processor 330 or 1830 needs a procedure to measure all 48 cells using the 6 registers. A first alternative is shown in FIG. 10, a second alternative is shown in FIG. 11, and a third alternative is shown in FIG. 13.

FIG. 10 is a table 1000 demonstrating correlated interference testing. To generate the table 1000, the processor 330 or 1830 tests 6 combinations per round to accommodate the 6 registers. The processor 330 or 1830 tests first combinations marked with right-leaning diagonal lines in a first round, second combinations marked with dots in a second round, third combinations marked with left-leaning diagonal lines in a third round, and so on.

The first round includes G3 and XGS3 transmitting together, G2 and XGS6 transmitting together, G1 and XGS7 transmitting together, G4 and XGS8 transmitting together, G5 and XGS2 transmitting together, and G6 and XGS4 transmitting together. The second round includes G3 and XGS6 transmitting together, G2 and XGS7 transmitting together, G1 and XGS8 transmitting together, G4 and XGS2 transmitting together, G5 and XGS4 transmitting together, and G6 and XGS5 transmitting together. The third round includes G3 and XGS7 transmitting together, G2 and XGS8 transmitting together, G1 and XGS2 transmitting together, G4 and XGS4 transmitting together, G5 and XGS5 transmitting together, and G6 and XGS1 transmitting together. After 8 such rounds, the processor 330 or 1830 will have tested all combinations of the G-PON ONUs 217 and the XGS-PON ONUs 223.

However, the correlated testing is relatively slow because only 6 combinations are tested in each round and 8 rounds are needed. In addition, most cells do not contain a BER above the BER threshold. In other words, most combinations do not provide desired information.

C. Set-Wise Interference Testing

FIG. 11 is a table 1100 demonstrating set-wise interference testing. The table 1100 increases efficiency compared to the table 1000. To generate the table 1100, the processor 330 or 1830 divides the XGS-PON ONUs 223 into 2 sets, set A comprising XGS3 and XGS6-XGS8 and set B comprising XGS2, XGS4-XGS5, and XGS1. The processor 330 or 1830 tests first combinations marked with right-leaning diagonal lines in a first round and second combinations marked with dots in a second round. The first combinations include G3, G2, and G1 against set A and G4-G6 against set B. The second combinations include G3, G2, and G1 against set B and G4-G6 against set A.

Figure 12:
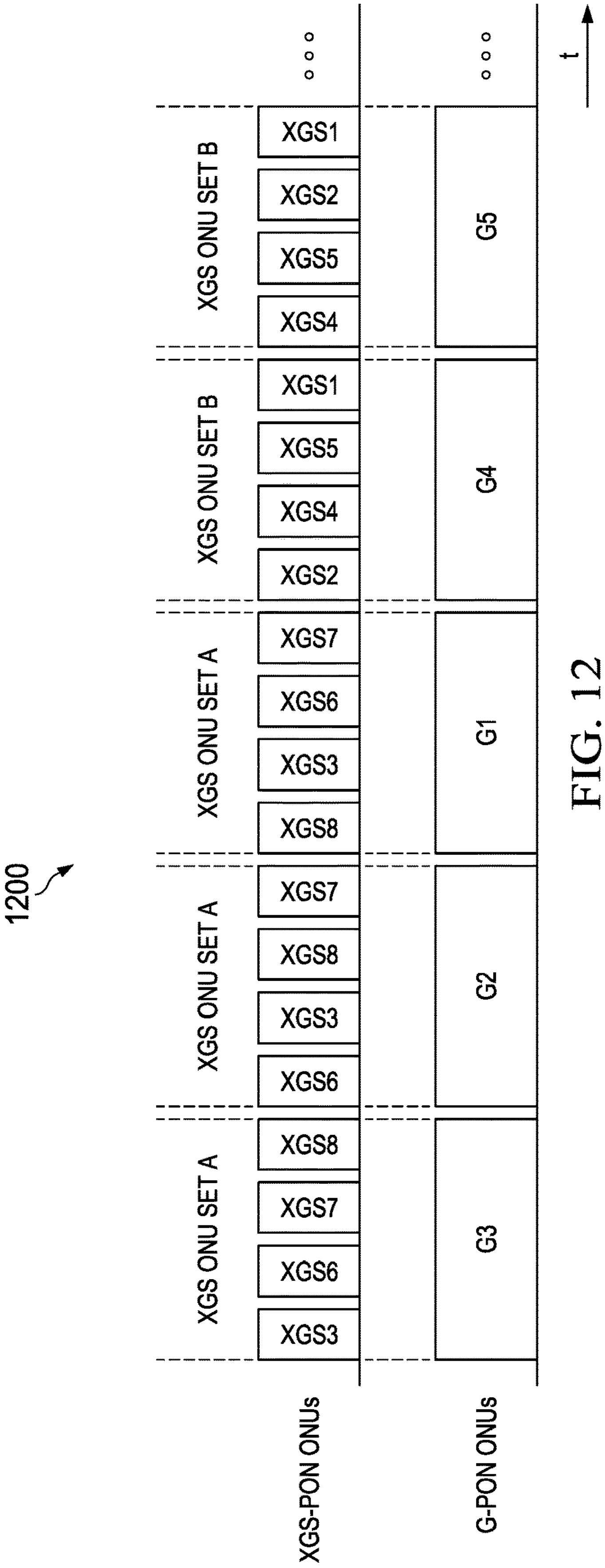
FIG. 12 is an ONU transmission timeline corresponding to FIG. 11.

FIG. 12 is an ONU transmission timeline 1200 corresponding to FIG. 11. The ONU transmission timeline 1200 shows most of the first round. G3 transmits while XGS3 and XGS6-XGS8 sequentially transmit; then G2 transmits while XGS3 and XGS6-XGS8 sequentially transmit; then G1 transmits while XGS3 and XGS6-XGS8 sequentially transmit; G4 transmits while XGS2, XGS4-XGS5, and XGS1 sequentially transmit; and then G5 transmits while XGS2, XGS4-XGS5, and XGS1 sequentially transmit. The ellipsis to the right of the ONU transmission timeline 1200 indicates that round 1 completes with G6 transmitting while XGS2, XGS4-XGS5, and XGS1 sequentially transmit. After round 1, round 2 continues in a similar manner. As can be seen, the XGS-PON ONUs 223 may transmit in any order within each G-PON ONU 217 transmission period.

Returning to FIG. 11, the G-PON OLT 207 uses one register to record errors from a set of XGS-PON ONUs 223 to a particular G-PON ONU 217. As a result, the G-PON OLT 207 uses all 6 registers in the first round, then all 6 registers again in the second round for a total of 12 register recordations. In the first round, G3, G2, and G1 are error free against set A, and G5-G6 are error free against set B. In the second round, G4-G6 are error free against set A, but G3, G2, and G1 have errors against set B and require further testing as shown in FIG. 13. Out of the 12 register recordations, 8 indicate no errors and 4 indicate errors, yielding an approximate 67% error-free rate.

FIG. 13 is a table 1300 demonstrating continued set-wise interference testing. To generate the table 1300, the processor 330 or 1830 divides the XGS-PON ONUs 223 into 4 sets, set A comprising XGS2, set B comprising XGS4, set C comprising XGS5, and set D comprising XGS1. The processor 330 or 1830 tests first combinations marked with spaced dots in a first round, second combinations marked with left-leaning diagonal lines in a second round, third combinations marked with clustered dots in a third round, and fourth combinations marked with right-leaning diagonal lines in a fourth round. The G-PON OLT 207 uses 4 registers in each round for a total of 16 register recordations. Out of the 16 register recordations, 7 indicate no errors and 9 indicate errors, yielding an approximate 44% error-free rate.

The table 1100 shows 2 rounds and the table 1300 shows 4 rounds, totaling 6 rounds. In contrast, the table 1000 shows 8 rounds. Thus, the set-wise interference testing yields 2 fewer rounds than the correlated interference testing. In addition, the set-wise interference testing scales logarithmically with the number of G-PON ONUs 217 and XGS-PON ONUs 223. Furthermore, the set-wise interference testing may show even better relative results when there are fewer errors because fewer rounds with set sizes of 1 are needed.

II. Schedule of Coordinate Transmission

The high-level schedule 800 does not specify each particular transmission time for the G-PON ONUs 217 and the XGS-PON ONUs 223. In addition, the high-level schedule 800 does not show or resolve conflicts between the G-ONUs 217 and the XGS-PON ONUs 223. The following approaches address those issues.

A. Conflict Between Two ONUs

FIG. 14 is a table 1400 demonstrating conflict between ONUs. The processor 330 or 1830 generates the table 1400 by sorting the G-PON ONUs 217 and the XGS-PON ONUs 223 as described above. The processor 330 or 1830 then generates a schedule of coordinated transmission by creating paths in the table 1400 that cover all G-PON ONUs 217 and XGS-PON ONUs 223 while avoiding interference. The processor 330 or 1830 does that by calculating a parametric curve based on a parameter of time t, a function X(t) representing XGS-PON ONU 223 transmission, and a function Y(t) representing G-PON ONU 217 transmission. Because both X(t) and Y(t) change over time, they determine a joint path through the table 1400. An initial output of X(t) is an XGS-PON DBA process, and an initial output of Y(t) is a G-PON DBA process.

The schedule is shown in the table 1400 as the arrowed line. During a first period, XGS3 and G3 transmit. During a second period, XGS3 and G2 transmit. During a third period, XGS6 and G2 transmit. During a fourth period, XGS8 and G2 transmit. During a fifth period, XGS7 and G2 transmit. During a sixth period, XGS7 and G1 transmit. XGS2 does not have traffic to transmit immediately after the sixth period, so it is skipped over at that point. During a seventh period, XGS4 and G1 transmit, but the transmission causes an error and thus a conflict between XGS4 and G1. The conflict begins at time T1 and ends at time T2. During an eighth period, XGS5 and G4 transmit. During a ninth period, XGS5 and G6 transmit. During a tenth period, XGS1 and G6 transmit. The schedule continues in that manner for each DBA cycle.

B. Conflict Resolution Between Two ONUs

FIG. 15 is a table 1500 demonstrating conflict resolution between two ONUs. To minimize the impact of the error shown in the table 1400, the processor 330 or 1830 schedules a transition from the sixth period to the eighth period at a time (T1+T2)/2. The processor 330 or 1830 therefore avoids the simultaneous transmission of XGS4 and G1 and the resulting error.

However, that conflict resolution allocates more time to G1 and less time to XGS4. To improve fairness, the processor 330 or 1830 may enhance the XGS-PON ONU 223 DBA in two pieces, a first piece dividing a time (T1+T2)/2 over XGS3, XGS6, XGS8, and XGS7, and a second piece dividing a time [T−(T1+T2)/2] over XGS4, XGS5, and XGS1. T is a DBA cycle time. Similarly, the processor 330 or 1830 may enhance the G-PON ONU 217 DBA in two pieces, a first piece dividing the time (T1+T2)/2 over G3, G2, and G1, and a second piece dividing the time [T−(T1+T2)/2] over G4 and G6. The conflict resolution ensures that each of the G-PON ONUs 217 and XGS-PON ONUs 223 transmits a fairer timeslot in the DBA cycle.

C. Conflicts Among More Than Two ONUs

Figure 16:
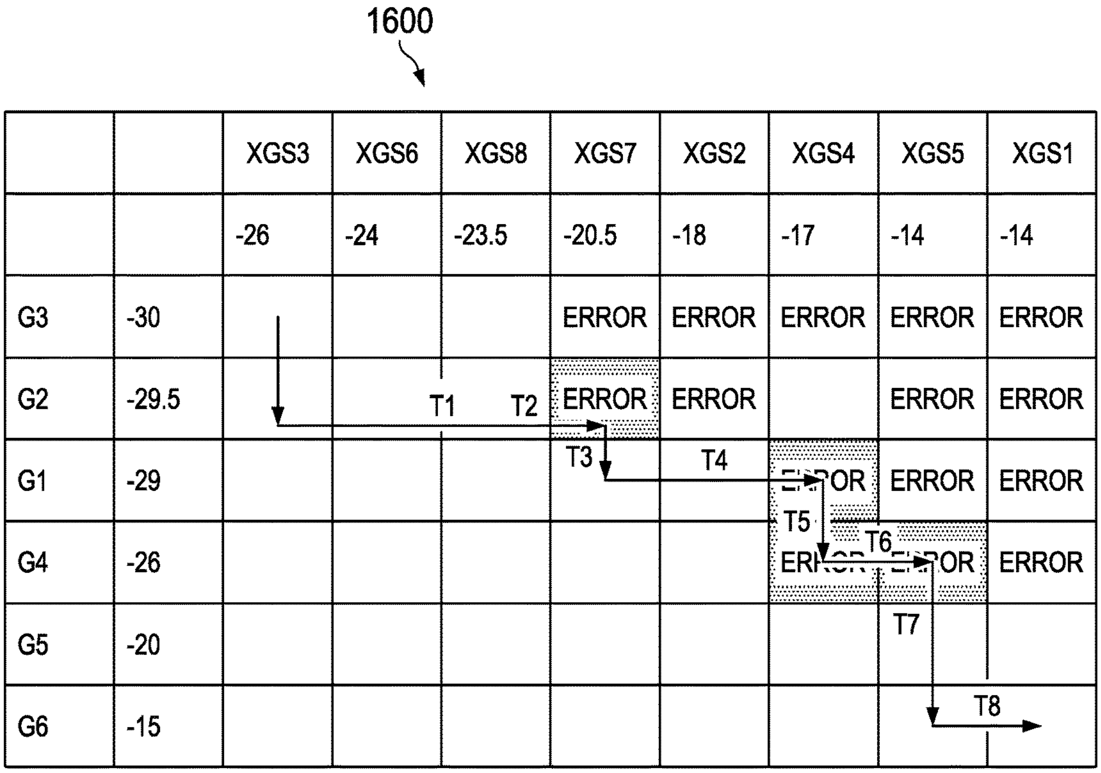
FIG. 16 is a table demonstrating conflicts among more than two ONUs.

FIG. 16 is a table 1600 demonstrating conflicts among more than two ONUs. The table 1600 is similar to the table 1400 in FIG. 14. However, unlike the table 1400, which shows 1 conflict between 2 ONUs, the table 1600 shows 4 conflicts. Specifically, simultaneous transmission between XGS7 and G2, between XGS4 and G1, XGS4 and G4, and XGS5 and G4 all cause errors. The conflict beginning at time T2 and ending at time T3 may be addressed as shown in the table 1500. However, the remaining conflicts may not.

D. Conflict Resolution Among More Than Two ONUs

Figure 17:
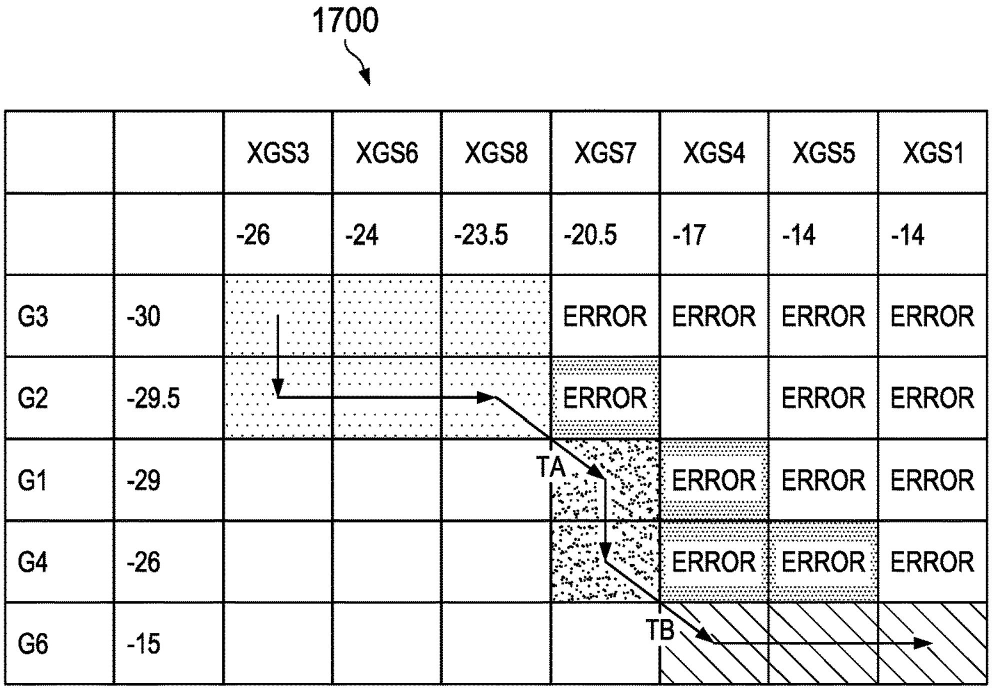
FIG. 17 is a table demonstrating conflict resolution among more than two ONUs.

FIG. 17 is a table 1700 demonstrating conflict resolution among more than two ONUs. To generate the table 1700, first, the processor 330 or 1830 removes the column corresponding to XGS2 and the row corresponding to G5 from table 1600. The G-PON OLT 207 may do so because the arrowed line does not land on those G-PON ONUs 217 and XGS-PON ONUs 223 in the DBA cycle shown.

Second, the processor 330 or 1830 breaks apart a path of the arrowed line into a first segment marked with spaced dots, a second segment marked with clustered dots, and a third segment marked with left-leaning diagonal lines. The first segment, the second segment, and the third segment are adjacent to one or more error cells, diagonal from each other, and error-free. Assuming TA is the time when the path moves from the first segment to the second segment and TB is the time when the path moves from the second segment to the third segment, the G-PON OLT 207 must determine an algorithm to set TA and TB.

In a first algorithm, TA is the average of the time T2, where the path moves from XGS8 to XGS7, and T3, where the path moves from G2 to G1. Similarly, TB is the average of T4, where the path moves from XGS7 to XGS4, and T7, where the path moves from G4 to G6. In a second algorithm, the XGS-PON ONU 223 and the G-PON ONU 217 transition times alternate. For instance, odd DBA cycles use the XGS-PON ONU 223 times, and even DBA cycles use the G-PON ONU 217 times.

An OLT comprises a storage means and at least one processing means. The storage means is configured to store instructions. The at least one processing means is configured to exchange WDM communications between first ONUs of a first kind and second ONUs of a second kind to enable transmission by the first ONUs and the second ONUs in different wavelengths bands; perform identification of interfering first ONUs and susceptible second ONUs; and generate, based on the identification, a schedule of coordinated transmission of the first ONUs and the second ONUs to reduce interference between the first ONUs and the second ONUs.

The term "about" means a range including ±10% of the subsequent number unless otherwise stated. While several embodiments have been provided in the present disclosure, it may be understood that the disclosed systems and methods might be embodied in many other specific forms without departing from the spirit or scope of the present disclosure. The present examples are to be considered as illustrative and not restrictive, and the intention is not to be limited to the details given herein. For example, the various elements or components may be combined or integrated in another system or certain features may be omitted, or not implemented.

In addition, techniques, systems, subsystems, and methods described and illustrated in the various embodiments as discrete or separate may be combined or integrated with other systems, components, techniques, or methods without departing from the scope of the present disclosure. Other items shown or discussed as coupled may be directly coupled or may be indirectly coupled or communicating through some interface, device, or intermediate component whether electrically, mechanically, or otherwise. Other examples of changes, substitutions, and alterations are ascertainable by one skilled in the art and may be made without departing from the spirit and scope disclosed herein.

What is claimed is:

1. An optical line terminal (OLT), (OLT) comprising:
- a memory storing instructions; and
- at least one processor in communication with the memory, the at least one processor configured, upon execution of the instructions, to perform the following steps:
  - exchange wavelength-division multiplexing (WDM) communications between first optical network units (ONUs) of a first kind and second ONUs of a second kind to enable transmission by the first ONUs and the second ONUs in different wavelength bands;
  - perform identification of interfering first ONUs and susceptible second ONUs by performing interference testing between the first ONUs and the second ONUs; and
  - generate, based on the identification, a schedule of coordinated transmission of the first ONUs and the second ONUs to reduce interference between the first ONUs and the second ONUs.

2. The OLT of claim 1, wherein the first ONUs are either 10-gigabit-capable symmetric passive optical network (XGS-PON) ONUs or 10-gigabit-capable passive optical network (XG-PON) ONUs.

3. The OLT of claim 1, wherein the second ONUs are gigabit-capable passive optical network (G-PON) ONUs.

4. The OLT of claim 1, wherein the schedule is based on dynamic bandwidth allocation (DBA).

5. The OLT of claim 4, wherein the schedule schedules least-interfering first ONUs first in a DBA cycle, medium-interfering first ONUs second in the DBA cycle, and most-interfering first ONUs last in the DBA cycle.

6. The OLT of claim 5, wherein the schedule schedules most-susceptible second ONUs first in the DBA cycle, medium-susceptible second ONUs second in the DBA cycle, and least-susceptible second ONUs last in the DBA cycle.

7. The OLT of claim 1, further comprising a transmitter configured to transmit the schedule to the first ONUs and the second ONUs.

8. The OLT of claim 1, wherein the at least one processor is further configured to execute the instructions to cause the OLT to further perform the identification by:
- determining an interference level generated by the first ONUs based on the interference testing; and
- determining a susceptibility level of the second ONUs to interference from the first ONUs based on the interference testing.

9. The OLT of claim 8, wherein the at least one processor is further configured to execute the instructions to cause the OLT to further perform the interference testing between every combination of the first ONUs and the second ONUs.

10. The OLT of claim 8, wherein the interference testing is performed based on correlated interference testing or is performed based on set-wise interference testing.

11. The OLT of claim 8, wherein the at least one processor is further configured to execute the instructions to cause the OLT to further perform the identification by:

determining a first ranking of the first ONUs based on the interference level; and determining a second ranking of the second ONUs based on the susceptibility level.

12. The OLT of claim 1, wherein the identification is based on received signal strength indicators (RSSIs) of the first ONUs and the second ONUs.

13. A method implemented by an optical line terminal (OLT), the method comprising:

exchanging wavelength-division multiplexing (WDM) communications between first optical network units (ONUs) of a first kind and second ONUs of a second kind to enable transmission by the first ONUs and the second ONUs in different wavelength bands;

performing identification of interfering first ONUs and susceptible second ONUs by performing interference testing between the first ONUs and the second ONUs; and generating, based on the identification, a schedule of coordinated transmission of the first ONUs and the second ONUs to reduce interference between the first ONUs and the second ONUs.

14. The method of claim 13, wherein the first ONUs are either 10-gigabit-capable symmetric passive optical network (XGS-PON) ONUs or 10-gigabit-capable passive optical network (XG-PON) ONUs, and wherein the second ONUs are gigabit-capable passive optical network (G-PON) ONUs.

15. The method of claim 13, wherein the schedule is based on dynamic bandwidth allocation (DBA), wherein the schedule schedules least-interfering first ONUs first in a DBA cycle, medium-interfering first ONUs second in the DBA cycle, and most-interfering first ONUs last in the DBA cycle, and wherein the schedule schedules most-susceptible second ONUs first in the DBA cycle, medium-susceptible second ONUs second in the DBA cycle, and least-susceptible second ONUs last in the DBA cycle.

16. The method of claim 13, further comprising further performing the identification by:

determining an interference level generated by the first ONUs based on the interference testing; and determining a susceptibility level of the second ONUs to interference from the first ONUs, based on the interference testing.

17. The method of claim 16, further comprising further performing the identification by:

determining a first ranking of the first ONUs based on the interference level; and determining a second ranking of the second ONUs based on the susceptibility level.

18. The method of claim 13, wherein the identification is based on received signal strength indicators (RSSIs) of the first ONUs and the second ONUs.

19. A non-transitory computer-readable medium storing computer instructions that configure at least one processor, upon execution of the computer instructions, to perform the following steps:

exchange wavelength-division multiplexing (WDM) communications between first optical network units (ONUs) of a first kind and second ONUs of a second kind to enable transmission by the first ONUs and the second ONUs in different wavelength bands;

perform identification of interfering first ONUs and susceptible second ONUs by performing interference testing between the first ONUs and the second ONUs; and generate, based on the identification, a schedule of coordinated transmission of the first ONUs and the second ONUs to reduce interference between the first ONUs and the second ONUs.

20. The method of claim 13, wherein the interference testing is performed based on correlated interference testing or is performed based on set-wise interference testing.

* * * * *